United States Patent [19]

Emberson

[11] Patent Number: 5,796,971
[45] Date of Patent: Aug. 18, 1998

[54] METHOD FOR GENERATING PREFETCH INSTRUCTION WITH A FIELD SPECIFYING TYPE OF INFORMATION AND LOCATION FOR IT SUCH AS AN INSTRUCTION CACHE OR DATA CACHE

[76] Inventor: David R. Emberson, 300 Moore Creek Rd., Santa Cruz, Calif. 95060

[21] Appl. No.: 918,707

[22] Filed: Aug. 22, 1997

Related U.S. Application Data

[63] Continuation of Ser. No. 499,364, Jul. 7, 1995, abandoned.

[51] Int. Cl.$^6$ ............................................. G06F 12/08
[52] U.S. Cl. ...................... 395/383; 711/123; 711/122; 711/141
[58] Field of Search ........................ 395/383, 450, 395/449, 468

[56] References Cited

U.S. PATENT DOCUMENTS 5,307,477  4/1994  Taylor et al. ............................ 395/403
5,317,718  5/1994  Jouppi ..................................... 395/464
5,537,573  7/1996  Ware et al. .............................. 395/464
5,551,001  8/1996  Cohen et al. ............................ 395/449

OTHER PUBLICATIONS

Hwang et al. (Computer Architecture and Parallel Processing) McGraw-Hill Co. pp. 102–107, 1984.

*Primary Examiner*—Parshotam S. Lall
*Assistant Examiner*—Gautam R. Patel
*Attorney, Agent, or Firm*—Marger, Johnson, McCollom & Stolowitz, P.C.

[57] ABSTRACT

Disclosed is a method and system for providing for the prefetching of data or instructions. A prefetch instruction which is in an instruction stream is processed by memory management unit (MMU) where prefetch cache control information is placed as part of the already existing prefetch instruction. Once processed by the MMU, the prefetch instruction thus contains binary fields allowing the operating system or runtime software to control cache prefetching by assigning values to the binary fields which provide the optimal cache set location and the optimal amount of data to be prefetched and thus reduces thrashing.

32 Claims, 4 Drawing Sheets

METHOD FOR GENERATING PREFETCH INSTRUCTION WITH A FIELD SPECIFYING TYPE OF INFORMATION AND LOCATION FOR IT SUCH AS AN INSTRUCTION CACHE OR DATA CACHE

This is a continuation of application Ser. No. 08/499,364 filed Jul. 7, 1995, now abandoned.

FIELD OF THE INVENTION

This invention relates to memory management units, and more particularly relates to prefetch instructions which provide data and instructions to the cache memory from the main memory.

BACKGROUND OF THE INVENTION

The newest generation computer components, particularly microprocessors (CPUs), operate at speeds much higher than those of previous generations. As a CPU operates, it must access both data and instructions from the main memory to carry out its operations. Thus, as CPU's speeds increase, the demand for high speed data and instruction retrieval increases as well. Typically, however, the access time for data and instruction retrieval from the main memory severely slows the operation of the CPU because the CPU sits idly waiting to receive the requested data or instructions. This time lag is called memory latency.

At the current time, a CPU may have a less than ten nanosecond clock while a main memory may have a 60 nanosecond clock, the combination creating a 10 to 1 memory latency ratio. In the near future, improved microprocessors are expected to have less than three nanosecond clocks, while main memory is expected to improve to having only a 50 nanosecond clock. Thus the memory latency is expected to increase to a greater than 15 to 1 ratio.

There are two components to memory latency. The first, bus transport time, is a function of how much time it takes to transport the request to the memory and then to transport the requested information. The second is the main memory access time itself. Address decoding and other logic of the dynamic RAMs' (DRAM) CMOS technology are responsible for the inherent delay in accessing information from the main memory. Because applications generate only virtual addresses (VA), by storing the translation of a VA to a physical addresses (PA) of information in the main memory in a location closer to the CPU than is the main memory, the time to access information stored in main memory is reduced. In this way, the "memory management unit" (MMU) operates to help manage data and instructions as they are accessed by the CPU. Accordingly, translations are stored in a "translation lookaside buffer" (TLB) which is part of the MMU. If the requested translation is not in the TLB, there is a TLB miss, and the translation of VA to PA must be obtained by going through pagetables which are stored in main memory.

To avoid memory latency, data and instructions which are frequently used are stored in the "cache" memory which is closer to the CPU in addition to being stored in main memory. A cache has capacity for far fewer lines than does the main memory and is static RAM (SRAM) (which is much faster, consumes much more power and is much more expensive than DRAM). In fact, the TLB discussed above is similar to a cache memory. Accordingly, the function of a cache is to reduce the effect of memory latency by placing often used data or instructions close to the CPU instead of calling it from the main memory from where it takes much longer access.

While a cache memory reduces the effects of memory latency, its structure exacerbates problems of its own. Turning to FIG. 1, the simplest type of cache, a single-set cache, is shown. The main memory 10 is depicted as being substantially farther away from the cache 12 and CPU 14 combination than are the cache 12 and CPU 14 from each other. Particularly, the problem of "thrashing" introduces a speed payment known as "miss penalty." The miss penalty is equal to the time delay required to load the cache with the needed data.

Thrashing results when multiple data elements use the same cache set. Returning to FIG. 1, main memory 10 is broken down into "pages" (in practice, a main memory would include many more pages) each including lines from 100–1000 in 100 offset unit increments. Thus, the first page occupies lines 100–1000, the second includes lines 1100–2000 and so on.

To illustrate thrashing, FIG. 1 shows that the CPU has requested line 1400 which is retrieved from main memory and is stored in offset 400 of the cache. Sometime shortly thereafter, the CPU has requested line 2400 which is retrieved from main memory and is also mapped into offset 400 of the cache and thus has overwritten the previously stored line 1400. Here, a miss penalty has been incurred because the cache did not contain the requested line and was required to retrieve it from main memory. Shortly thereafter, the CPU again requires and requests line 1400 which is retrieved from main memory and mapped into offset 400 of the cache and therefore has overwritten previously stored line 2400. Again, a miss penalty has been incurred. When the two lines, 1400 and 2400 are both needed on a regular basis by the CPU, the ping-pong effect of thrashing causes the miss penalty to be repeatedly incurred.

Thrashing severely slows down the CPU's processing speed because so much time is spent waiting for frequently used information (data or instructions) to be received from the main memory. In such a case, compounded miss penalties dominate the CPU's performance. Conversely, had the often used information been stored in the cache at all times, the CPU could have operated at its peak capacity. Accordingly, as microprocessor speeds continue to improve, the payment for miss penalties increases as well.

There are many different types of cache structures which have been introduced in an effort to eliminate the thrashing problem. For example, one popular solution is to use, instead of a single-set cache, a "multi-set cache." Turning to FIG. 2, a two-set cache, which can potentially provide more than one offset location for otherwise competing lines, is shown. Both set 12 and set 14 have a 400 offset location in which to store information. Thus, both lines 1400 and 2400 can be stored in the cache simultaneously and alternating requests for either of these most likely will not cause thrashing. Actual benefit is dependent upon the actual program running. However, even with the multi-set improvement over the single-set cache, the performance cost for miss penalties continues to increase as CPU processing speed increases.

In Harvard architecture where there are separate caches for data and instructions, thrashing is reduced, at least to the extent that data thrashes with instructions. Of course, as mentioned above, SRAM is expensive and so the number of sets of a multi-set cache, particularly in a Harvard architecture, has its limitations.

Another method for avoiding thrashing is to "prefetch" data and instructions to the cache before they are needed. That is, various mechanisms exist which attempt to predict what information will be needed by the CPU before it is actually needed rather than waiting for the request from the CPU. For example, built into the SPARC (R) version 9 architecture is the capability to execute data prefetch instructions that will prefetch data to the data cache. However, the prefetch instruction provides a prefetch of an invariable, static size and provides no other capabilities.

Currently, a static and non-particular prefetch instruction is inserted into compiled code at compile time and is carried out as part of the compiled instruction stream. While an invariant, static prefetch instruction is simple to add to the instruction stream and carry out by the existing architecture, cache memory management is not necessarily enhanced by such a scheme in that there is no information in the instruction stream regarding into which cache or cache set to store the retrieved information or how much information to retrieve. In light of the significant improvements to the speed of CPU's expected in the near future, it would be advantageous to provide prefetch controls which further reduce the likelihood of thrashing.

Since Harvard architecture provides different caches in which to store instructions and data and the prior art prefetch provides for the prefetching of data, it would be advantageous to provide a dynamic method and system which causes instructions and data to be written to 'heir appropriate caches. Moreover, it would be beneficial to dynamically control the size of the prefetch or the particular set of a multi-set cache to which the information is written and thus maximize the cache memory management process.

SUMMARY OF THE INVENTION

This invention is a method and system which provides for the prefetching of data or instructions from main memory. A prefetch instruction which is part of an instruction stream is processed by an enhanced MMU where prefetch cache control information is annexed to the already existing prefetch instruction. Once processed by the TLB, the prefetch instruction thus contains binary fields allowing the operating system, loader or runtime software to control cache prefetching by assigning values to the binary fields which provide the optimal cache set location and the optimal amount of data to be prefetched and thus reduces thrashing.

Support of Harvard architectures with separate instruction and data caches is provided by dynamic software control of the separate instruction and data caches. That is, the prefetch instruction includes a field which, depending upon the type of information retrieved, indicates whether the prefetch is for data or instructions. The cache set number is dynamically adjusted by the runtime software or operating system to indicate into which set the information is to be preloaded. The size field is also dynamically adjusted to provide variable prefetch sizes depending upon the requested information. An address field indicates the address where prefetching begins.

DETAILED DESCRIPTION OF THE INVENTION

As discussed above, various mechanisms exist which attempt to predict what information the CPU is going to need before it is actually needed rather than waiting for the request from the CPU. Certain prefetch mechanisms perform prefetches in anticipation of the next line to be missed by the cache. Prefetch instructions are used in the current PA Risc, SGI-MIPS, and Power PC for example.

In general, the line following the last line fetched is prefetched and stored in the line buffer, with the assumption made that all misses are compulsory; that is, the fetched line has not previously resided in the cache. Caches where there is a prefetch in anticipation of the next miss are called "fetch always" or Class 2 caches. Conversely, caches where only missed lines are fetched are called Class 1, fetch on demand, or fetch on fault caches. This invention is used in combination with any type of the prefetch mechanism and is executed as an extension to an initial prefetch command to manage the cache structure.

In a computer system, the compiler typically incorporates into the object program any instructions required to run the program on a given computer. That is, a compiler is a program that converts an input program in a particular high-level language (source code) to the machine language of a particular machine type (object code). Accordingly, the above described prefetch commands are generated by a compiler and are executed as part of the resulting object code or instruction stream.

As described above, prior to this invention, a prefetch instruction provides a prefetch of an invariable, static size and provides no other capabilities such as cache set management. That is, the prior art prefetch instruction only to triggers a prefetch. This invention, on the other hand, provides an enhanced TLB (and thus MMU) which processes a prefetch instruction so that, after processing, the TLB entry contains binary fields allowing the operating system (O/S), loader or runtime software to control prefetching. In so doing, the prefetch hardware is provided with information as to the optimal cache set location and the optimal amount of data to be prefetched and thus reduces thrashing.

By placing the prefetch control information in the TLB prefetch entry, cache controls are implemented on a per-page basis rather than being explicitly emitted by a prefetch instruction. Such a mechanism allows compatibility with architectures having prefetch instructions with no control information. In addition, the controls may be changed at runtime on a per-page basis by operating system software.

Figure 1:
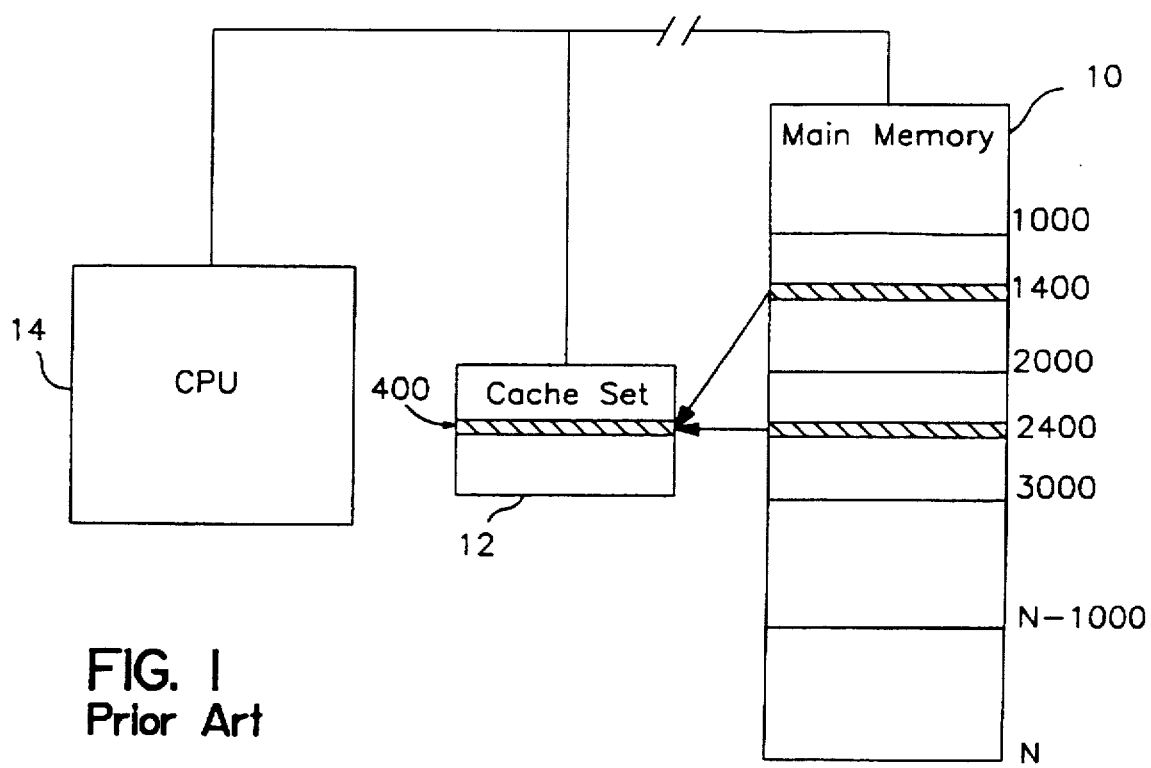
FIG. 1 depicts a prior art single-set cache.
Figure 2:
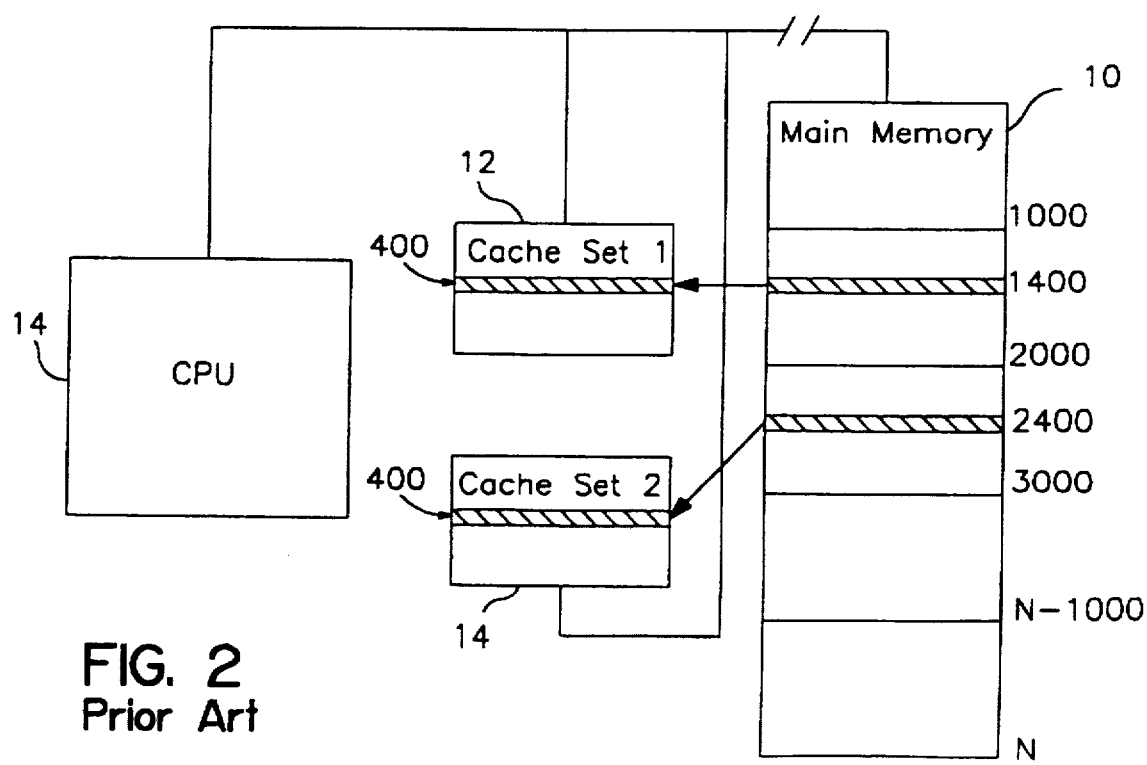
FIG. 2 depicts a prior art multi-set cache.
Figure 3:
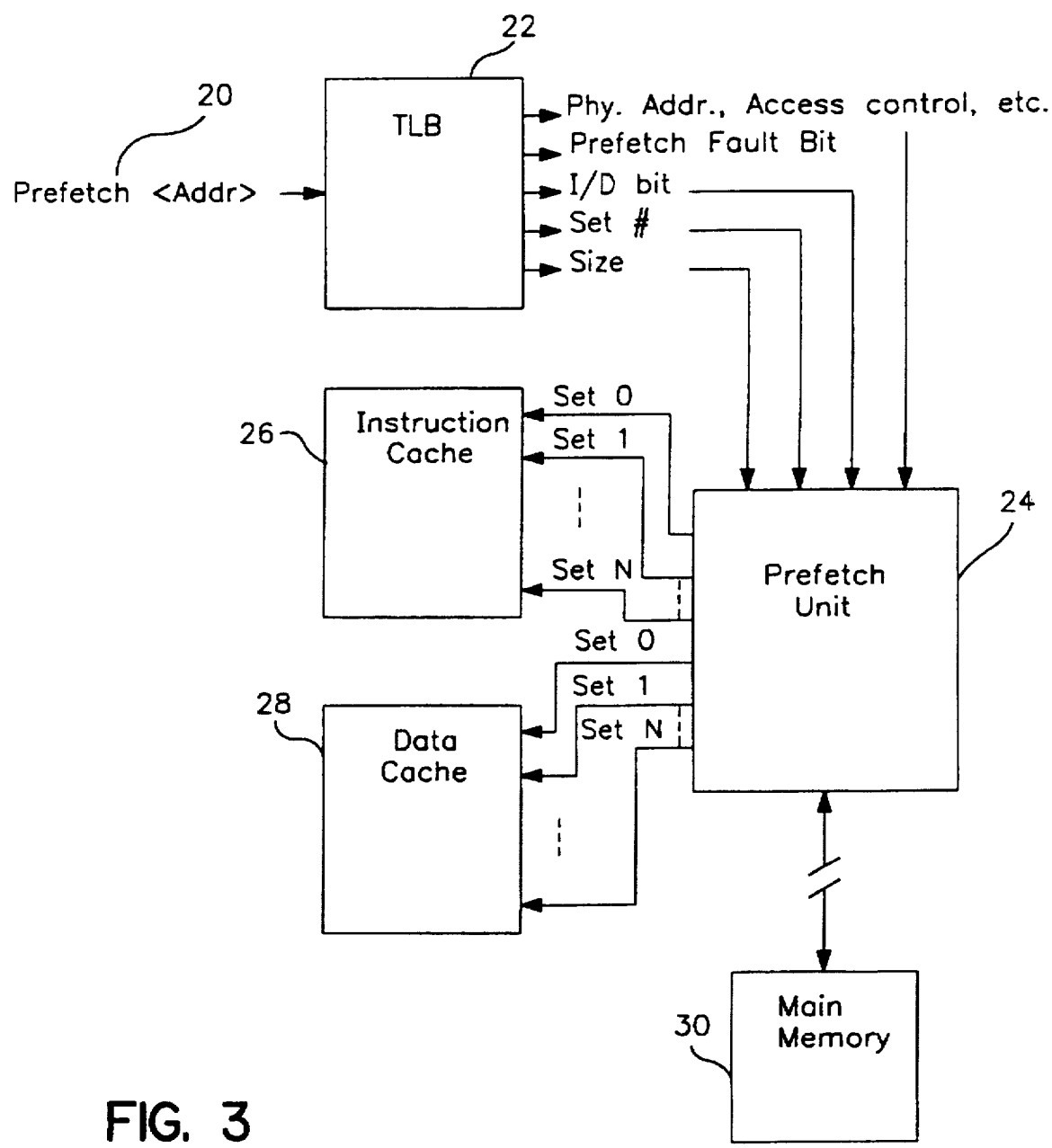
FIG. 3 shows the a translation lookaside buffer receiving a prefetch instruction and the output of the lookaside buffer including the prefetch instruction fields of this invention.

Turning to FIG. 3, a prefetch instruction 20 includes of a virtual address as part of an instruction stream processed by TLB 22. Typically, the TLB generates an <Addr Translation Info> field which contains information on the virtual-to-physical address mapping, access control and other binary elements contained in a conventional TLB 22 entry. According to this invention, however, the resulting TLB 22 processed address contains additional fields including the following binary fields:

<Addr Translation Info><Prefetch Fault Bit><I/D BIT><SET#><SIZE>.

The MMU output fields are then filled by the O/S to include binary values useful in two operations, that is, retrieving the information from memory and managing the cache. The <Prefetch Fault Bit> causes processor fault when a prefetch instruction is executed for an address that maps to the MMU when it has its Prefetch Fault Bit set. The <I/D BIT> field indicates whether the prefetch is for data or instructions. The <SET #> field is identified to indicate into which set the information is to be preloaded. The <SIZE> field provides a variable prefetch size. The above prefetch instruction fields or any portion thereof can be filled by either the O/S, loader, runtime software or compiler stored in any accessible memory location. Compilers and loaders can be used to supply default initial values for the fields.

In the alternative, the empty fields may be provided by the compiler in the compiled prefetch instruction so that an operating system, loader or runtime software may ultimately provide binary values to the fields during execution according to particular policies, and such is within the scope of this invention.

Once filled, these fields are processed by prefetch unit 24 which provides a memory request to the main memory 30 and executes storage of the prefetched information to the cache memory, including the instruction cache 26 and data cache 28. Accordingly, thrashing is reduced by filling the fields described above so that the prefetch control hardware 24 is provided with information as to the optimal cache set location and amount of data to be fetched.

As shown in FIG. 3, the prefetch unit 24 has sent data retrieved from main memory to the instruction cache 26 and the data cache 28 and has assigned that the information be stored in a particular set as indicated by the arrows labeled "Set 0,""Set 1,". . . "Set N." The usefulness of such a designation is illustrated in FIG. 4.

Figure 4:
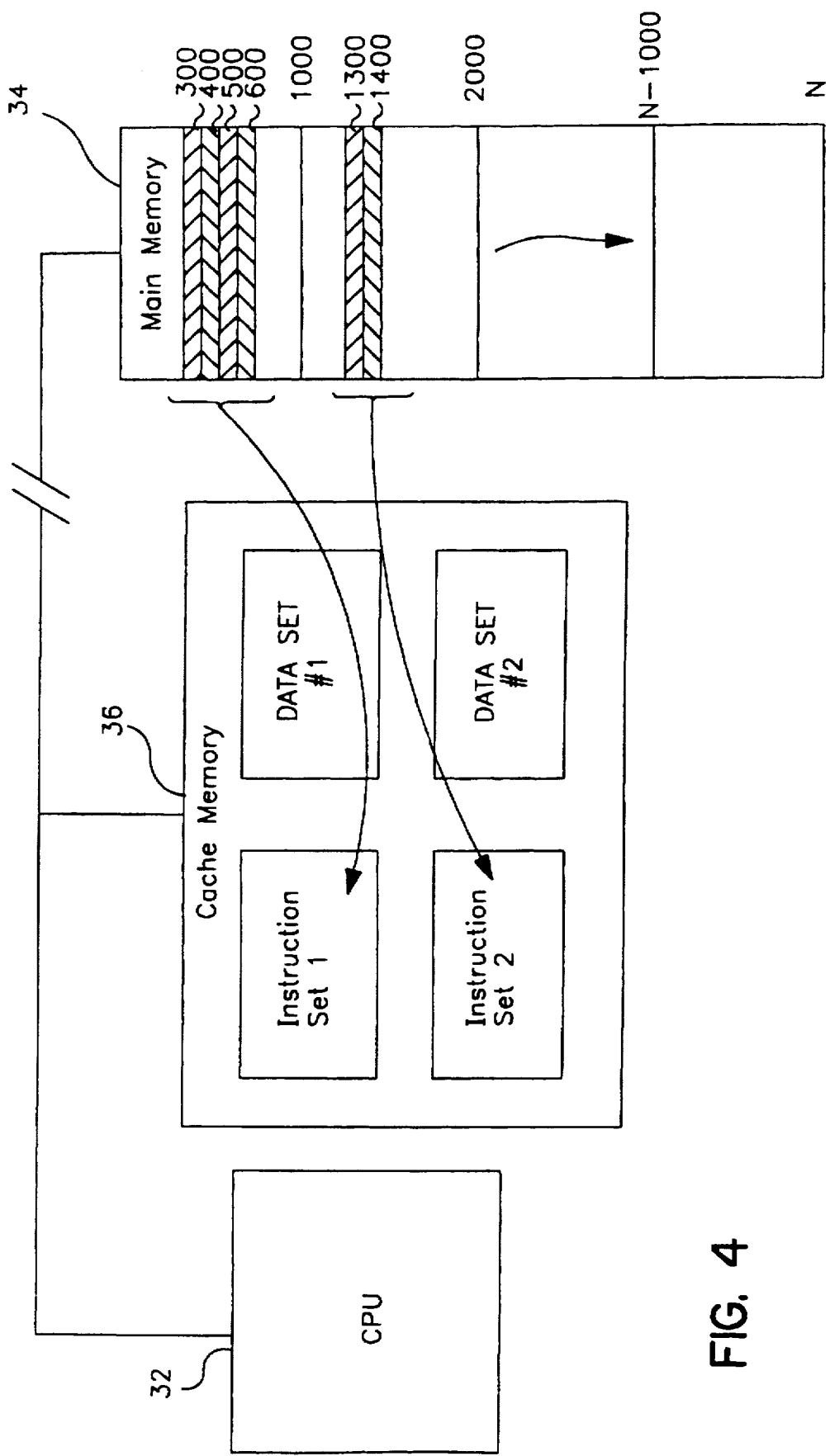
FIG. 4 depicts a Harvard architecture system where a prefetch instruction of this invention is carried out.

Turning to FIG. 4, CPU 32 and main memory 34 are shown with cache memory 36 which is a multi-set (here, two-set) cache of Harvard architecture. Instruction Cache Sets#1 and#2 are shown are Data Cache Sets#1 and#2. A prefetch instruction generated by the O/S, for example includes the following values:
<Prefetch Addr Info><I><1><300><4>.

In such a case, the prefetch is executed to retrieve and store in the Instruction Cache Set#1 instructions starting at line 300 and of a size of four (4) lines, that is, lines 300, 400, 500 and 600. By providing the prefetch hardware 24 (see FIG. 3) with this information, reduction of thrashing is enhanced in the following way. The memory block starting at line 300 and consisting of four lines preferably includes the necessary lines to carry out a particular operation and are stored at Instruction Set#1. In a different prefetch, the memory block starting at line 1300 consists of two lines which are necessary to carry out a different particular operation and therefore are stored in a different set than the block starting at line 300, i.e. Instruction Set#2, to avoid a cache miss in Instruction Set#1. The processes for optimization of the size fields and cache set location fields are discussed below.

As discussed above, the <SIZE> field provides a binary number which indicates how many lines to fetch. In one implementation, optimizing the size field is carried out by monitoring cache misses by recording a history of each prefetch in a histogram on the program calendar kept in a "first in—first out" (FIFO) manner. A histogram is a table of, for example, physical addresses, prefetches corresponding to those addresses, the time of prefetch and the number of clock cycles particular data was maintained in the cache. In this mechanism the O/S or the run-time software has a policy regarding replacing the bits and receives information about misses and replacements, and therefore is able to vary the size field according to its policy. In a different method, the O/S determines the size by using one default size for instruction fetches and another default size for data fetches. In another implementation, the size can be statistically assigned by the loader software on a per-page basis and the loader can allocate similarly sized data structures in the same page. In yet another implementation, the program runs several times and its performance is measured with various size increments used as defaults on per-page basis.

Figure 5:
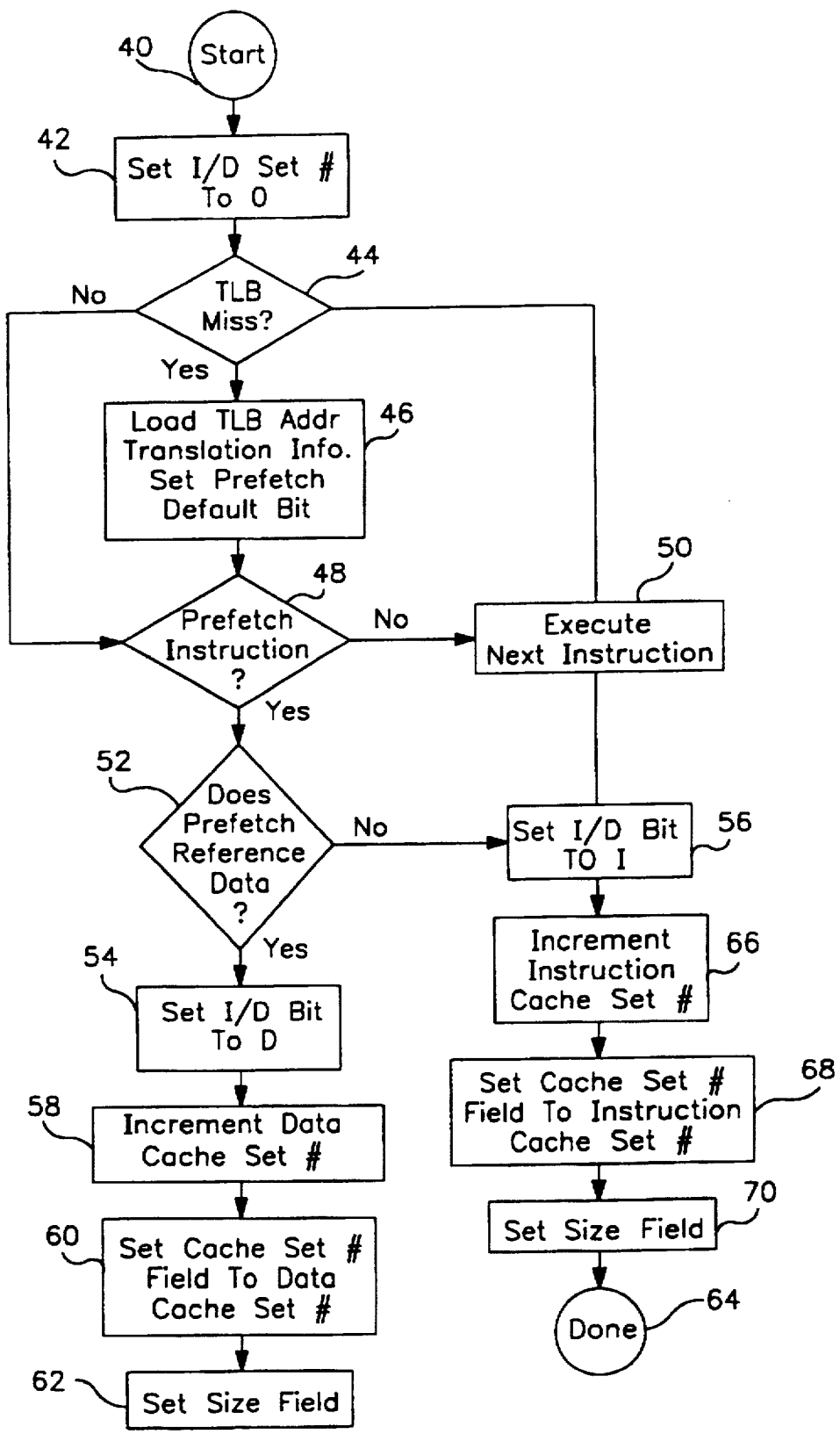
FIG. 5 is a flowchart depicting the steps for carrying out a prefetch instruction of this invention.

Turning to FIG. 5, a flowchart is shown which illustrates an order in which to carry out steps of this invention. The program is initially started at element 40. The counter is initialized 42 so that all fields are set to zero. The next step is to determine whether there was a TLB miss 44. If the answer is yes, that there was a TLB miss, the next step is to initiate an intercept instruction, one which sets the prefetch fault bit. That is, the first prefetch instruction that references this TLB entry will cause a Prefetch Fault at step 46. The O/S can then determine if the faulting reference was referring to instructions or data and set the I/D bit appropriately. The Cache Set# field can be assigned a value in round-robin fashion so that the least recently used cache set number is then placed in the Cache Set# field. The Size field is also set as described above. The O/S loads the TLB accordingly then, asks whether this instruction this a prefetch instruction 48. If it is not a prefetch instruction, the next step is to simply execute the next instruction 50.

Returning for a moment to step 44, if it turns out that there is no TLB miss, the system skips step 46 and then asks whether this instruction is a prefetch instruction at 48. Again, if it is not a prefetch instruction, the next step is to simply execute the next instruction 50.

If at step 48, the system determines that the subject instruction is a prefetch instruction, the inquiry is whether the prefetch references data at step 52. If the prefetch instruction references data, the I/D bit is set to data at step 54. If the prefetch instruction references instructions, the I/D bit is set to instructions at step 56. In a system with Harvard architecture, the <I/D> field will indicate which cache to store the retrieved information, that is, in the instruction cache or the data cache.

As discussed above, if the prefetch will be fetching data at step 52, the system then sets the I/D bit to data at step 54. The system and method then increments the Data Cache Set# at step 58. Thus, the Cache Set# can be set to a particular Data Cache Set # at step 60. The system then sets the Size field at step 62 in a manner such as those described above and is done at 64 with the optimization and control of the cache memory. The prepared instruction is then executed accordingly.

Also discussed above, if the prefetch will not be fetching data at step 52, the system then sets the I/D bit to instructions at step 56. The system and method then increments the Instruction Cache Set# at step 66. Thus, the Cache Set# can be set to a particular Instruction Cache Set# at step 68. The system then sets the Size field at step 70 in a manner such as those described above and is done at 64 with the optimization and control of the cache memory. The prepared instruction is then executed accordingly. Finally, the information having a predetermined size is written to the specific cache set.

Simultaneously filed U.S. patent application, entitled Tunable Software Control of Harvard Architecture Cache Memories Using Prefetch Instructions, Ser. No. 08/499,312, filed on Jul. 7, 1995, which describes among other features a sequence in which to carry out a prefetch instruction having the binary fields as described here, is incorporated by reference herein.

While the above description of FIG. 5 presupposes that the platform on which this program runs includes the capability of carrying out prefetches and is a multi-set Harvard architecture, this method and system is, of course, cross platform. The invention described herein resides in the fields themselves and a system and method by which to generate and utilized them.

I claim:

1. A method for use by a computer which has a main memory for maintaining stored information which is either data or instructions and a cache memory including a data cache and an instruction cache, said method for enhancing an already existing prefetch instruction for use by a prefetch unit, comprising the steps of:

receiving said already existing prefetch instruction;

adding a dynamically adjustable unfilled instruction/data field to form an annexed prefetch instruction;

receiving said annexed prefetch instruction including said dynamically adjustable unfilled instruction/data field; and filling said dynamically adjustable unfilled instruction/ data field with a prefetch type value which indicates whether said stored information is instructions or data, such indicating whether to store said information in said instruction cache or in said data cache to generate an enhanced prefetch instruction.

2. A method as recited in claim 1, said method further comprising the steps of:

adding a dynamically adjustable unfilled size field to further form said annexed prefetch instruction;

filling said dynamically adjustable unfilled size field with a prefetch type value which indicates how much information to retrieve from said main memory and store in said cache memory.

3. A method as recited in claim 1 wherein said instruction cache includes at least two cache sets and wherein said data cache includes at least two cache sets, said method further comprising the steps of:

adding a dynamically adjustable unfilled set field to further form said annexed prefetch instruction;

filling said dynamically adjustable unfilled cache set field with a prefetch type value to indicate which of said cache sets to store information retrieved from said main memory.

4. A method as recited in claim 1 wherein said computer runs an operating system and wherein said operating system provides said prefetch type value which is inserted into said instruction/data field.

5. A method as recited in claim 1 wherein said computer runs runtime software and wherein said runtime software provides said prefetch type value which is inserted into said instruction/data field.

6. A method for use by a computer which has a main memory for maintaining stored information and a cache memory, said method for enhancing an already existing prefetch instruction for use by a prefetch unit, comprising the steps of:

receiving said already existing prefetch instruction;

adding a dynamically adjustable unfilled size field to form an annexed prefetch instruction;

receiving said annexed prefetch instruction;

filling said dynamically adjustable unfilled size filed with a prefetch type value which indicates how much information to retrieve from said main memory and store in said cache to generate an enhanced prefetch instruction.

7. A method as recited in claim 6 wherein said cache memory includes an instruction cache and a data cache and wherein said initial prefetch instruction further includes an unfilled instruction/data field, said method further comprising the steps of:

adding a dynamically adjustable unfilled instruction/data field to further form said annexed prefetch instruction;

filling said dynamically adjustable unfilled instruction/ data field with a prefetch type value which indicates whether said information is instructions or data, such indicating whether to store said information in said instruction cache or said data cache.

8. A method as recited in claim 6 wherein said instruction cache includes at least two cache sets and wherein said data cache includes at least two cache sets, said method further comprising the steps of:

adding a dynamically adjustable unfilled cache set field to further form said annexed prefetch instruction;

filling said dynamically adjustable unfilled cache set field with a prefetch type value which indicates which of said cache sets to store said information retrieved from said main memory.

9. A method as recited in claim 6 wherein said computer runs an operating system and wherein said operating system provides said prefetch type value which is inserted into said instruction/data field.

10. A method as recited in claim 6 wherein said computer runs runtime software and wherein said runtime software provides said prefetch type value which is inserted into said instruction/data field.

11. A method for use by a computer which has a main memory for maintaining stored information and a cache memory including at least two cache sets, said method for enhancing an already existing prefetch instruction for use by a prefetch unit, comprising the steps of:

receiving said already existing prefetch instruction;

adding a dynamically adjustable unfilled cache set field to form an annexed prefetch instruction;

receiving an annexed prefetch instruction including an unfilled cache set field; and filling said unfilled cache set field with a prefetch type value to indicate which of said at least two cache sets to store information retrieved from said main memory to generate an enhanced prefetch instruction.

12. A method as recited in claim 11 said method further comprising the steps of:

adding a dynamically adjustable unfilled size field to further form said annexed prefetch instruction; and filling said dynamically adjustable unfilled size field with a prefetch type value which indicates how much information to retrieve from said main memory and store in said cache memory.

13. A method as recited in claim 11 wherein said information is either instructions or data and wherein said cache memory includes an instruction cache and a data cache said method further comprising the steps of:

adding a dynamically adjustable unfilled instruction/data field to further form said annexed prefetch instruction; and filling said dynamically adjustable unfilled instruction/ data field with a prefetch type value to indicate whether said information is instructions or data, such indicating whether to store said information in said instruction cache or said data cache.

14. A method as recited in claim 11 wherein said computer runs an operating system and wherein said operating system provides said prefetch type value which is inserted into said cache set field.

15. A method as recited in claim 11 wherein said computer runs runtime software and wherein said runtime software provides said prefetch type value which is inserted into said cache set field.

16. A method for use by a computer which has a memory management unit, a main memory for maintaining stored information which is either data or instructions and a cache memory including a data cache and an instruction cache, said method for generating an enhanced prefetch instruction, comprising the steps of:

receiving an initial prefetch instruction; and said memory management unit enhancing said initial prefetch instruction to generate an enhanced prefetch instruction as output which includes a dynamically adjustable unfilled instruction/data field which is subsequently filled with a prefetch type value which indicates whether said stored information is instructions or data such indicating whether to store said information in said instruction cache or said data cache.

17. A method as recited in claim 16 further comprising the step of:

said memory management unit further enhancing said initial prefetch instruction to include a dynamically adjustable size field including a prefetch type value which indicates how much information to retrieve from said main memory and store in said cache memory.

18. A method as recited in claim 16 wherein said instruction cache includes at least two cache sets and wherein said data cache includes at least two cache sets, said method further comprising the step of:

said memory management unit further enhancing said initial prefetch instruction to include a dynamically adjustable cache set field including a prefetch type value which indicates which of said cache sets to store information retrieved from said main memory.

19. A method for use by a computer which has a memory management unit, a main memory for maintaining stored information and a cache memory, said method for providing an enhanced prefetch instruction, comprising the steps of:

receiving an initial prefetch instruction; and said memory management unit enhancing said initial prefetch instruction to generate an enhanced prefetch instruction as output which includes a dynamically adjustable unfilled size field which is subsequently filled with a prefetch type value which indicates how much information to retrieve from said main memory and store in said cache memory.

20. A method as recited in claim 19 wherein said cache memory includes an instruction cache and a data cache, said method further comprising the step of:

said memory management unit further enhancing said initial prefetch instruction to include a dynamically adjustable instruction/data field including a prefetch type value which indicates whether said information is instructions or data and thus to indicate whether to store said information in said instruction cache or said data cache.

21. A method as recited in claim 20 wherein said instruction cache includes at least two cache sets and wherein said data cache includes at least two cache sets, said method further comprising the step of:

said memory management unit further enhancing said initial prefetch instruction to include a dynamically adjustable cache set field including a prefetch type value which indicates which of said cache sets to store said information retrieved from said main memory.

22. A method for use by a computer which has a memory management unit, a main memory for maintaining stored information and a cache memory including at least two cache sets, said method for providing an enhanced prefetch instruction, comprising the steps of:

receiving an initial prefetch instruction; and said memory management unit enhancing said initial prefetch instruction to generate an enhanced prefetch instruction as output which includes a dynamically adjustable unfilled cache set field which is subsequently filled with a prefetch type value which indicates which of said at least two dynamically adjustable cache sets to store information retrieved from said main memory.

23. A method as recited in claim 22 further comprising the step of:

said memory management unit further enhancing said initial prefetch instruction to include a dynamically adjustable size field including a prefetch type value which indicates how much information to retrieve from said main memory and store in said cache memory.

24. A method as recited in claim 22 wherein said information is either instructions or data and wherein said cache memory includes an instruction cache and a data cache, said method further comprising the step of:

said memory management unit further enhancing said initial prefetch instruction to include a dynamically adjustable instruction/data field including a prefetch type value which indicates whether said information is instructions or data and thus to indicate whether to store said information in said instruction cache or said data cache.

25. A computer system including a CPU, a main memory for maintaining stored information which is either data or instructions, a cache memory including a data cache and an instruction cache, wherein said CPU is configured to execute an instruction stream which includes a prefetch instruction configured to effect the prefetch of information stored in said main memory which will be required by said CPU, said system for providing an enhanced prefetch instruction, comprising:

a memory management unit configured to receive said initial prefetch instruction and to generate as output an enhanced prefetch instruction which includes a dynamically adjustable unfilled instruction/data field which is subsequently filled with a prefetch type value which indicates whether the information required by said CPU which is stored in said main memory is instructions or data, and thus indicates whether to store said information in said instruction cache or said data cache; and a prefetch unit configured to execute said enhanced prefetch instruction so that said information is retrieved from said main memory and is stored in either said instruction cache or said data cache in accordance with said prefetch type value included in said dynamically adjustable instruction/data field.

26. A system as recited in claim 25 wherein said enhanced prefetch instruction generated by said memory management unit further includes a dynamically adjustable size field including a prefetch type value configured to indicate how much information to retrieve from said main memory and store in said cache memory.

27. A system as recited in claim 25 wherein said instruction cache includes at least two instruction cache sets and wherein said enhanced prefetch instruction generated by said memory management unit further includes a dynamically adjustable instruction cache set field including a prefetch type value configured to indicate which of said instruction cache sets to store information retrieved from said main memory.

28. A system as recited in claim 25 wherein said data cache includes at least two data cache sets and wherein said enhanced prefetch instruction generated by said memory management unit further includes a dynamically adjustable data cache set field including a prefetch type value configured to indicate which of said data cache sets to store information retrieved from said main memory.

29. A prefetch enhancement device operable in conjunction with a computer having a CPU, a main memory for maintaining stored information which is either data or instructions, wherein said CPU is configured to execute an instruction stream which includes a prefetch instruction configured to effect the prefetch of information stored in said main memory which will be required by said CPU, said device comprising:

- a memory management unit configured to receive a prefetch instruction and to generate as output an enhanced prefetch instruction having a dynamically adjustable unfilled instruction/data field which is subsequently filled with a prefetch type value which indicates whether the information required by said CPU which is stored in said main memory is instructions or data, and thus indicates whether to store said information in said instruction cache or said data cache; and
- a prefetch unit configured to execute said enhanced prefetch instruction so that said information is retrieved from said main memory and is stored in either said instruction cache or said data cache in accordance with said prefetch type value included in said dynamically adjustable instruction/data field.

30. A device as recited in claim 29 wherein said enhanced instruction prefetch generated by said memory management unit further includes a dynamically adjustable size field including a prefetch type value configured to indicate how much information to retrieve from said main memory and store in said cache memory.

31. A device as recited in claim 29 wherein said instruction cache includes at least two instruction cache sets and wherein said enhanced prefetch instruction generated by said memory management unit further includes a dynamically adjustable instruction cache set field including a prefetch type value configured to indicate which of said instruction cache sets to store information retrieved from said main memory.

32. A device as recited in claim 29 wherein said data cache includes at least two data cache sets and wherein said enhanced prefetch instruction generated by said memory management unit further includes a dynamically adjustable data cache set field including a prefetch type value configured to indicate which of said data cache sets to store information retrieved from said main memory.

* * * * *

UNITED STATES PATENT AND TRADEMARK OFFICE
CERTIFICATE OF CORRECTION

PATENT NO.   : 5,796,971
DATED        : August 18, 1998
INVENTOR(S)  : David R. Emberson It is certified that error appears in the above-identified patent and that said Letters Patent is hereby corrected as shown below:

Title page,
Item [73], Assignee, should read -- Sun Microsystems, Inc., Mountain View, CA. --

Signed and Sealed this

Twenty-third Day of April, 2002

Attest:

JAMES E. ROGAN
*Attesting Officer*  *Director of the United States Patent and Trademark Office*